United States Patent
Uno et al.

(10) Patent No.: US 8,274,800 B2
(45) Date of Patent: Sep. 25, 2012

(54) DC-DC SWITCHING POWER SUPPLY WITH POWER FACTOR CORRECTION

(75) Inventors: Yoshiyuki Uno, Nagaokakyo (JP);
Tomokuni Tokugawa, Kyoto (JP);
Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 358 days.

(21) Appl. No.: 12/647,562

(22) Filed: Dec. 28, 2009

(65) Prior Publication Data
US 2010/0091523 A1    Apr. 15, 2010

Related U.S. Application Data

(63) Continuation of application No. PCT/JP2008/056770, filed on Apr. 4, 2008.

(30) Foreign Application Priority Data

Jun. 29, 2007    (JP) ................................. 2007-173215

(51) Int. Cl.
*H02M 3/335* (2006.01)

(52) U.S. Cl. ..................... 363/16; 363/21.12; 363/21.13; 363/21.15

(58) Field of Classification Search .............. 363/15, 363/16, 17, 21.07, 21.08, 21.09, 21.12, 21.13, 363/21.15, 21.16, 95, 97; 323/282, 283, 323/285

See application file for complete search history.

(56) References Cited

U.S. PATENT DOCUMENTS

| | | | | |
|---|---|---|---|---|
| 4,754,385 A | * | 6/1988 | McDade et al. | 363/16 |
| 5,495,164 A | | 2/1996 | Heng | |
| 6,344,986 B1 | * | 2/2002 | Jain et al. | 363/89 |
| 6,462,962 B1 | * | 10/2002 | Cuk | 363/16 |
| 6,700,801 B2 | * | 3/2004 | Morita et al. | 363/21.12 |
| 7,466,565 B2 | * | 12/2008 | Tanaka | 363/16 |
| 7,944,153 B2 | * | 5/2011 | Greenfeld | 315/291 |
| 2004/0218410 A1 | | 11/2004 | Yamada et al. | |

FOREIGN PATENT DOCUMENTS

| | | |
|---|---|---|
| JP | 05-184139 A | 7/1993 |
| JP | 05-191976 A | 7/1993 |

(Continued)

OTHER PUBLICATIONS

Official Communication issued in International Patent Application No. PCT/JP2008/056770, mailed on Jun. 17, 2008.

(Continued)

*Primary Examiner* — Matthew Nguyen
*Assistant Examiner* — Zekre Tsehaye
(74) *Attorney, Agent, or Firm* — Keating & Bennett, LLP

(57) ABSTRACT

A digital signal processing circuit which performs average current control is disposed on a secondary side of a transformer of an isolated DC-DC converter, and a switching control signal output from the digital signal processing circuit is transmitted to a switching element included in a power factor correction converter through an isolated drive circuit. The digital signal processing circuit obtains an average value of currents supplied to an inductor in accordance with a voltage output from a bias winding of the inductor or an output from a secondary side of a current transformer which detects a drain current of the switching element. Furthermore, the average value of the currents corresponds to a waveform (full-wave rectification sine wave) of an input voltage Vi.

12 Claims, 10 Drawing Sheets

FOREIGN PATENT DOCUMENTS

| | | |
|---|---|---|
| JP | 09-252578 A | 9/1997 |
| JP | 11-235040 A | 8/1999 |
| JP | 2000-014144 A | 1/2000 |
| JP | 2001-333573 A | 11/2001 |
| JP | 2003-158693 A | 5/2003 |
| JP | 2003-169479 A | 6/2003 |
| JP | 2003-244962 A | 8/2003 |
| JP | 2004-072814 A | 3/2004 |
| JP | 2004-112957 A | 4/2004 |
| JP | 2004-393900 * | 12/2004 |
| JP | 2005-198430 A | 7/2005 |
| JP | 2006-087192 A | 3/2006 |
| JP | 2006-304430 A | 11/2006 |
| JP | 2006-311795 A | 11/2006 |

OTHER PUBLICATIONS

Official Communication issued in corresponding Japanese Patent Application No. 2009-521547, mailed on Jan. 5, 2012.

* cited by examiner

DC-DC SWITCHING POWER SUPPLY WITH POWER FACTOR CORRECTION

BACKGROUND OF THE INVENTION

1. Field of the Invention

The present invention relates to an AC-DC converter which receives an alternate current power and outputs a direct current voltage, and particularly to a switching power supply apparatus including a Power Factor Correction ("PFC") converter which improves a power factor.

2. Description of the Related Art

Conventionally, harmonic current restriction is in effect in various categories divided in accordance with usage and input power based on "Japanese Guidelines for Reduction of Harmonic Emission Caused By Electrical and Electronic Equipment for Household and General Use" in Japan, and similarly, the harmonic current is restricted in European countries and various other countries around the world. Therefore, a PFC converter is added to power supply apparatuses for typical home electronics so as to suppress the harmonic current (see, for example, Japanese Unexamined Patent Application Publication No. 5-191976).

An example of a general switching power supply apparatus, which receives a commercial AC power as an input power, rectifies and smoothes the commercial AC power and converts the commercial AC power into a DC voltage, and thereafter, performs switching of the DC voltage using a DC-DC converter. Accordingly, current is discontinuously supplied and is significantly shifted from a sine wave. This causes harmonic current.

In order to suppress the harmonic current, a PFC converter is provided after a full-wave rectifying circuit and before a smoothing circuit including a smoothing capacitor.

The PFC converter includes a chopper circuit. Since the PFC converter operates so that a waveform of an input current and a waveform of an input voltage are in phase, that is, they are approximated to a sine waveform, harmonic current is suppressed to a desired level or less.

The PFC converter is connected to a general isolated DC-DC converter which supplies a voltage to a load circuit.

FIG. 1 is a circuit diagram illustrating a switching power supply apparatus including a conventional PFC converter and an isolated DC-DC converter. The switching power supply apparatus 100 includes a PFC converter 10 which generates a predetermined DC voltage in response to an AC input power Vac input from terminals P11 and P12, and an isolated DC-DC converter 20 which receives the predetermined DC voltage output from the PFC converter 10 and supplies a predetermined DC power voltage to a load circuit 30 through terminals P21 and P22.

The PFC converter 10 includes a diode bridge B1 which performs full-wave rectification on the AC input power Vac, a switching circuit including a switching element Q1 which performs switching of a voltage output from the diode bridge B1, an inductor L1 which allows a current intermittently supplied by the switching element Q1 to flow and which accumulates and discharges exciting energy, a diode D1 which is disposed after the inductor L1 and which rectifies a voltage output from the inductor L1, and a smoothing capacitor C1 which smoothes a rectified output.

The isolated DC-DC converter 20 includes a transformer T1, a switching circuit including a switching element Q2 which is connected to a primary winding N1 included in the transformer T1 and which performs a switching of an output from the PFC converter 10, a diode D2 which rectifies an AC voltage generated in a secondary winding N2 included in the transformer T1 due to turning on or off of the switching element Q2, and a smoothing capacitor C2 which smoothes a rectified output. Furthermore, a control circuit 21 detects an output voltage and applies a switching control pulse to a drive circuit 22 of the switching element Q2 through a photocoupler PC1.

As described above, the control circuit 11 which performs the switching control of the PFC converter 10 is required to detect an input voltage and an input current since the control circuit 11 controls an input current and an output voltage. Therefore, the control circuit is disposed on a primary side of the isolated DC-DC converter 20.

In recent years, a control circuit included in a switching power supply circuit is defined by a digital control circuit, such as a micro computer or a DSP (Digital Signal Processor). An advantage obtained when the digital control circuit is used in the control circuit is that data is transmitted to or received from and signals are input to or output from a control unit included in an electronic apparatus, i.e., a load circuit. For example, a current state of operation of a converter can be transmitted from the digital control circuit included in the converter to the load circuit, and instructions for determining a timing when a voltage is output, a terminal defining a destination to which the voltage is output, and a magnitude of the voltage can be received from the load circuit.

However, to attain this advantage, an isolated unit (such as a pulse transformer or a photocoupler) which transmits data supplied from a secondary side to the digital control circuit while maintaining isolation of a primary side and the secondary side is required. However, a number of pulse transformers or photocouplers corresponding to a number of ports used for data communication are required. Accordingly, this type of digital control circuit is not realistic or feasible in terms of cost and space. Furthermore, when the isolated unit is used for signal transmission, it is difficult to transmit linear signals.

SUMMARY OF THE INVENTION

To overcome the problems described above, preferred embodiments of the present invention provide a switching power supply apparatus which has a significantly reduced size and cost.

A switching power supply apparatus according to a preferred embodiment of the present invention includes a PFC converter including a rectifying circuit arranged to perform full-wave rectification on AC input power supply, a switching circuit arranged to perform switching of a voltage output from the rectifying circuit, an inductor arranged to allow a current intermittently supplied from the switching circuit to flow, a rectifying/smoothing circuit arranged to rectify and smooth a voltage output from the inductor, and an average current control circuit arranged to control the switching circuit so that an average value of currents supplied to the inductor follows a voltage signal supplied from the AC input power supply, and an isolated DC-DC converter including a transformer, a switching circuit which is connected to a primary winding of the transformer and which is arranged to perform switching of an output from the PFC converter, and a rectifying/smoothing circuit arranged to rectify and smooth an AC voltage generated in a secondary winding of the transformer due to turning on or off of the switching circuit and outputs the AC voltage to an output terminal. A digital control circuit defines the average current control circuit and is disposed on a secondary side of the transformer of the isolated DC-DC converter, and a circuit arranged to transmit a switching control signal output from the digital control circuit to the switching circuit included in the PFC converter in an isolated state, a circuit arranged to transmit a signal used to detect a voltage output from the PFC converter to the digital control circuit in an isolated state, and a circuit arranged to transmit a value of a current supplied to the inductor included in the PFC converter to the digital control circuit in an isolated state are included.

The circuit arranged to transmit a value of a current supplied to the inductor in an isolated state preferably includes a circuit arranged to detect a current $I_D$ supplied to the switching circuit included in the PFC converter or a current $I_S$ supplied to the rectifying/smoothing circuit included in the PFC converter in an isolated state, and the digital control circuit preferably includes calculating circuit arranged to detect an average value between the minimum value and the maximum value of the current $I_D$ supplied to the switching circuit included in the PFC converter or the current $I_S$ supplied to the rectifying/smoothing circuit included in the PFC converter as an average value of currents supplied to the inductor included in the PFC converter.

The circuit arranged to transmit a value of a current supplied to the inductor in an isolated state preferably includes a circuit arranged to detect the current $I_D$ supplied to the switching circuit included in the PFC converter or the current $I_S$ supplied to the rectifying/smoothing circuit included in the PFC converter in an isolated state, and the digital control circuit preferably includes a calculating circuit arranged to detect an average value of currents supplied to the inductor included in the PFC converter in a current discontinuous mode in accordance with the minimum value ($I_{Db}$ or Isb) and the maximum value ($I_{Dp}$ or Isp) of a current $I_D$ supplied to the switching circuit included in the PFC converter or a current $I_S$ supplied to the rectifying/smoothing circuit included in the PFC converter, an on-period Ton, an off-period Toff, and a period Tr in which a current supplied to the inductor included in the PFC converter is zero which satisfy the relationship T=(Ton+Tiff+Tr) when it is assumed that a switching cycle of the switching circuit included in the PFC converter is denoted by T.

A switching power supply apparatus according to a preferred embodiment of the present invention includes a PFC converter including a rectifying circuit arranged to perform full-wave rectification on AC input power supply, a switching circuit arranged to perform switching of a voltage output from the rectifying circuit, an inductor arranged to allow a current intermittently supplied from the switching circuit to flow, a rectifying/smoothing circuit arranged to rectify and smooth a voltage output from the inductor, and a peak-current control circuit arranged to drive the switching circuit in a critical mode at a timing when a current supplied to the inductor becomes zero and to control the switching circuit so that a phase of a peak value of the current supplied to the inductor follows a phase of a voltage signal supplied from the AC input power supply, and an isolated DC-DC converter including a transformer, a switching circuit which is connected to a primary winding of the transformer and arranged to perform switching of an output from the PFC converter, and a rectifying/smoothing circuit arranged to rectify and smooth an AC voltage generated in a secondary winding of the transformer and outputs the AC voltage to an output terminal. A digital control circuit defining the peak current control circuit is disposed on a secondary side of the transformer of the isolated DC-DC converter. A circuit arranged to transmit a switching control signal output from the digital control circuit to the switching circuit included in the PFC converter in an isolated state, a circuit arranged to transmit a signal used to detect a voltage output from the PFC converter to the digital control circuit in an isolated state, a circuit arranged to transmit a value of the current supplied to the inductor included in the PFC converter to the digital control circuit in an isolated state, and a circuit arranged to transmit a timing when the current supplied to the inductor included in the PFC converter becomes zero to the digital control circuit in an isolated state are included.

Each of the switching power supply apparatuses described above preferably further includes a circuit arranged to transmit a voltage signal of the AC input power supply to the digital control circuit in an isolated state.

The circuit arranged to transmit a voltage signal supplied from the AC input power supply in an isolated state preferably includes a circuit arranged to detect a current $I_D$ supplied to the switching circuit included in the PFC converter or a current $I_S$ supplied to the rectifying/smoothing circuit included in the PFC converter in an isolated state, and the digital control circuit preferably includes a calculating circuit arranged to detect an instantaneous value of a voltage Vi input to the PFC converter in accordance with a difference between the minimum value and the maximum value of the current $I_D$ supplied to the switching circuit included in the PFC converter or the current $I_S$ supplied to the rectifying/smoothing circuit in the PFC converter, an inductance of the inductor included in the PFC converter, and an on-period Ton of the switching circuit included in the PFC converter.

The circuit arranged to transmit a voltage signal supplied from the AC input power supply in an isolated state preferably includes a circuit arranged to detect a phase of an instantaneous value of a voltage output from the rectifying circuit included in the PFC converter or a phase of a voltage of the AC input power supply and to transmit a signal including information on the phase in an isolated state, and the digital control circuit includes a calculating circuit arranged to generate a sine wave which is a waveform of a voltage input to the PFC converter in accordance with the signal including the information on the phase.

A switching power supply apparatus according to a preferred embodiment of the present invention includes a PFC converter including a rectifying circuit arranged to perform full-wave rectification on AC input power supply, a switching circuit arranged to perform switching of a voltage output from the rectifying circuit, an inductor arranged to allow a current intermittently supplied from the switching circuit to flow, a rectifying/smoothing circuit arranged to rectify and smooth a voltage output from the inductor, and an on-period control circuit arranged to drive the switching circuit in a critical mode at a timing when a current supplied to the inductor becomes zero and to control an on-period of the switching circuit to be constant, and an isolated DC-DC converter including a transformer, a switching circuit which is connected to a primary winding of the transformer and arranged to perform switching of an output from the PFC converter, and a rectifying/smoothing circuit arranged to rectify and smooth an AC voltage generated in a secondary winding of the transformer due to turning on or off of the switching circuit and outputs the AC voltage to an output terminal. A digital control circuit defining the on-period control circuit is disposed on a secondary side of the transformer of the isolated DC-DC converter. A circuit arranged to transmit a switching control signal output from the digital control circuit to the switching circuit included in the PFC converter in an isolated state, a circuit arranged to transmit a signal used to detect a voltage output from the PFC converter to the digital control circuit in an isolated state, a circuit arranged to transmit a value of the current supplied to the inductor included in the PFC converter to the digital control circuit in an isolated state, and a circuit arranged to transmit a timing when the current supplied to the inductor included in the PFC converter becomes zero to the digital control circuit in an isolated state are preferably included.

The circuit arranged to transmit a signal used to detect a voltage output from the PFC converter in an isolated state is defined by a transformer-type inductor having a main winding arranged to allow a current supplied to the switching circuit included in the PFC converter to flow and a bias winding which is connected to the main winding in an isolated state, and the digital control circuit includes a calculating circuit arranged to detect a voltage applied to opposite sides of the main winding of the inductor in accordance with a winding rate of the main winding to the bias winding of the inductor and a voltage of the bias winding of the inductor and to calculate a voltage Vo output from the PFC converter in accordance with a voltage Vbon obtained when the switching circuit included in the PFC converter is in an on state and a voltage Vboff obtained when the switching circuit is in an off state.

The circuit arranged to transmit a signal used to detect a voltage output from the PFC converter in an isolated state preferably includes a pulse transformer connected to opposite terminals of the inductor included in the PFC converter, and the digital control circuit includes a calculating circuit arranged to detect a voltage applied to opposite sides of the inductor in accordance with a voltage output from a secondary side of the pulse transformer, and to calculate the voltage Vo output from the PFC converter in accordance with a voltage Vbon obtained when the switching circuit included in the PFC converter is in an on state and a voltage Vboff obtained when the switching circuit is in an off state which are applied to the inductor.

The circuit arranged to transmit a signal used to detect a voltage output from the PFC converter in an isolated state preferably includes an auxiliary winding of the transformer disposed in the isolated DC-DC converter, and the digital control circuit includes a calculating circuit arranged to detect a voltage output from the PFC converter in accordance with a winding rate of the primary winding to the auxiliary winding of the transformer included in the isolated DC-DC converter and a voltage of the auxiliary winding.

The circuit arranged to transmit a signal used to detect a voltage output from the PFC converter in an isolated state preferably includes an auxiliary isolated DC-DC converter arranged to receive a voltage output from the PFC converter as an input power supply, to insulate the primary side and the secondary side of the transformer from each other, and to perform electrical conversion, and the digital control circuit includes a calculating circuit arranged to detect a voltage output from the PFC converter in accordance with a voltage output from the auxiliary isolated DC-DC converter and an input/output voltage rate of the auxiliary isolated DC-DC converter.

The circuit arranged to transmit a signal used to detect a voltage output from the PFC converter in an isolated state preferably includes the isolated DC-DC converter and a level shift circuit arranged to perform a level shift on a voltage output from the isolated DC-DC converter, and the digital control circuit includes a calculating circuit arranged to detect a voltage output from the PFC converter in accordance with a rate of a voltage output from the level shift circuit to a voltage input to the isolated DC-DC converter and the voltage output from the level shift circuit.

The circuit arranged to transmit a signal used to detect a voltage output from the PFC converter in an isolated state preferably includes a circuit arranged to detect a signal of the current supplied to the inductor included in the PFC converter in an isolated state, and the digital control circuit includes a calculating circuit arranged to calculate the voltage output from the PFC converter in accordance with an inclination of a change of the current supplied to the inductor when the switching circuit is in an on state and an off state of the switching circuit included in the PFC converter and an inductance of the inductor.

In each of the switching power supply apparatuses described above, a switching control circuit of the isolated DC-DC converter is preferably included in the digital control circuit.

In each of the switching power supply apparatuses described above, the digital control circuit preferably includes a control circuit arranged to perform data communication or input/output of a signal between the digital control circuit and a load circuit included in the isolated DC-DC converter.

Various preferred embodiments of the present invention provide the following advantages.

Since a circuit arranged to transmit a switching control signal output from the digital control circuit to the switching circuit included in the PFC converter in an isolated state, a circuit arranged to transmit a signal used to detect a voltage output from the PFC converter to the digital control circuit in an isolated state, and a circuit arranged to transmit a value of a current supplied to the inductor included in the PFC converter to the digital control circuit in an isolated state are included, a number of pulse transformers or photocouplers corresponding to the number of ports used for data communication with a load circuit are not required, and the space and cost are significantly reduced accordingly. In addition, a problem of a delay of a response for a signal can be prevented.

Since the circuit arranged to transmit a value of a current supplied to the inductor in an isolated state preferably includes a circuit arranged to detect a current $I_D$ supplied to the switching circuit included in the PFC converter or a current $I_S$ supplied to the rectifying/smoothing circuit included in the PFC converter in an isolated state, and the digital control circuit detects an average value between the minimum value and the maximum value of the current $I_D$ supplied to the switching circuit included in the PFC converter or the current $I_S$ supplied to the rectifying/smoothing circuit included in the PFC converter as an average value of currents supplied to the inductor included in the PFC converter, the average value of currents supplied to the inductor can be properly detected, and average-current control can be appropriately performed.

Since the circuit arranged to transmit a value of a current supplied to the inductor in an isolated state preferably includes a circuit arranged to detect the current $I_D$ supplied to the switching circuit included in the PFC converter or the current $I_S$ supplied to the rectifying/smoothing circuit included in the PFC converter in an isolated state, and the digital control circuit detects an average value of currents supplied to the inductor included in the PFC converter in a current discontinuous mode in accordance with the minimum value ($I_{Db}$ or Isb) and the maximum value ($I_{Dp}$ or Isp) of a current $I_D$ supplied to the switching circuit included in the PFC converter or a current $I_S$ supplied to the rectifying/smoothing circuit included in the PFC converter, an on-period Ton and an off-period Toff of the switching circuit included in the PFC converter, and a period Tr in which a current supplied to the inductor included in the PFC converter is zero, the average value of currents supplied to the inductor in the current discontinuous mode can be properly detected, and average-current control can be appropriately performed.

Since a digital control circuit defining the peak current control circuit is disposed on a secondary side of the transformer of the isolated DC-DC converter, and a circuit arranged to transmit a value of the current supplied to the inductor included in the PFC converter to the digital control circuit in an isolated state and a circuit arranged to transmit a timing when the current supplied to the inductor included in the PFC converter becomes zero to the digital control circuit in an isolated state are included, a number of pulse transformers or photocouplers corresponding to the number of ports used for data communication with a load circuit are not required, and the space and cost are reduced accordingly. In addition, a problem of a delay of a response for a signal can be prevented.

Since each of the switching power supply apparatuses configured as described above preferably further includes a circuit arranged to transmit a voltage signal supplied from the AC input power supply to the digital control circuit in an isolated state, a current which follows the voltage signal (sine wave signal) supplied from the AC input power supply can be input. Accordingly, a power factor is greatly improved.

Since the circuit arranged to transmit a voltage signal supplied from the AC input power supply in an isolated state includes a circuit arranged to detect a current $I_D$ supplied to the switching circuit included in the PFC converter or a current $I_S$ supplied to the rectifying/smoothing circuit included in the PFC converter in an isolated state, and the digital control circuit detects an instantaneous value of a voltage Vi input to the PFC converter in accordance with a difference between the minimum value and the maximum value of the current $I_D$ supplied to the switching circuit included in the PFC converter or the current $I_S$ supplied to the rectifying/smoothing circuit in the PFC converter, an inductance of the inductor included in the PFC converter, and an on-period Ton of the switching circuit included in the PFC converter, a waveform of the voltage input to the PFC converter can be detected, and an inductor current can be easily controlled so as to follow the voltage signal supplied from the AC input power supply.

Since the circuit arranged to transmit a voltage signal supplied from the AC input power supply in an isolated state preferably includes a circuit arranged to detect a phase of a voltage (full-wave rectification voltage) output from the rectifying circuit included in the PFC converter or a phase of a voltage of the AC input power supply and to transmit a signal including information on the phase in an isolated state, and the digital control circuit generates a sine wave which has a waveform of a voltage input to the PFC converter in accordance with the signal including the information on the phase, the inductor current can be easily controlled so as to follow the voltage signal (sine wave signal) supplied from the AC input power supply.

Since a digital control circuit defining the on-period control circuit is disposed on a secondary side of the transformer of the isolated DC-DC converter, and a circuit arranged to transmit a value of the current supplied to the inductor included in the PFC converter to the digital control circuit in an isolated state and a circuit arranged to transmit a timing when the current supplied to the inductor included in the PFC converter becomes zero to the digital control circuit in an isolated state are included, a number of pulse transformers or photocouplers corresponding to the number of ports used for data communication with a load circuit are not required, and the space and cost are reduced accordingly. In addition, a problem of a delay of a response for a signal can be prevented.

Since the PFC converter includes a transformer-type inductor including a main winding arranged to allow a current supplied to the switching circuit included in the PFC converter to flow and a bias winding which is connected to the main winding in an isolated state, and the digital control circuit detects a voltage applied to opposite sides of the main winding of the inductor in accordance with a winding rate of the main winding to the bias winding of the inductor and a voltage of the bias winding of the inductor and calculates a voltage Vo output from the PFC converter in accordance with a voltage Vbon obtained when the switching circuit included in the PFC converter is in an on state and a voltage Vboff obtained when the switching circuit is in an off state, the voltage output from the PFC converter can be detected with high accuracy.

Since a pulse transformer is connected to opposite terminals of the inductor included in the PFC converter, and the digital control circuit detects a voltage applied to opposite sides of the inductor in accordance with a voltage output from a secondary side of the pulse transformer, and calculates the voltage Vo output from the PFC converter in accordance with a voltage Vbon obtained when the switching circuit included in the PFC converter is in an on state and a voltage Vboff obtained when the switching circuit is in an off state which are applied to the inductor, the voltage output from the PFC converter can be detected with excellent responsiveness.

Since an auxiliary winding is included in the transformer disposed in the isolated DC-DC converter, and the digital control circuit detects a voltage output from the PFC converter in accordance with a winding rate of the primary winding to the auxiliary winding of the transformer included in the isolated DC-DC converter and a voltage of the auxiliary winding, the voltage output from the PFC converter can be detected without deteriorating a characteristic of the PFC converter.

Since an auxiliary isolated DC-DC converter is arranged to receive a voltage output from the PFC converter as an input power supply, to isolate the primary side and the secondary side of the transformer from each other, and to perform electrical conversion is provided, and the digital control circuit detects a voltage output from the PFC converter in accordance with a voltage output from the auxiliary isolated DC-DC converter and an input/output voltage rate of the auxiliary isolated DC-DC converter, the voltage output from the PFC converter can be detected without deteriorating a characteristic of the PFC converter.

Since the isolated DC-DC converter and a level shift circuit is arranged to perform a level shift on a voltage output from the isolated DC-DC converter are provided, and the digital control circuit is arranged to detect a voltage output from the PFC converter in accordance with a rate of a voltage output from the level shift circuit to a voltage input to the isolated DC-DC converter and the voltage output from the level shift circuit, the voltage output from the PFC converter can be detected without deteriorating a characteristic of the PFC converter.

Since a circuit arranged to detect a signal of the current supplied to the inductor included in the PFC converter in an isolated state is provided, and the digital control circuit calculates the voltage output from the PFC converter in accordance with an inclination of a change of the current supplied to the inductor when the switching circuit is in an on state and an off state of the switching circuit included in the PFC converter and an inductance of the inductor, a voltage output from the PFC converter can be detected with excellent responsiveness.

Since, in each of the switching power supply apparatuses described above, a switching control circuit of the isolated DC-DC converter includes the digital control circuit, a dedicated circuit for switching control of the isolated DC-DC converter is not required. Accordingly, the overall circuit configuration is simplified. Furthermore, since the digital control circuit recognizes states of the PFC converter and the isolated DC-DC converter, operation of the PFC converter and operation of the isolated DC-DC converter can be easily coordinated with each other. Accordingly, a switching power supply apparatus having high functionality can be provided.

In each of the switching power supply apparatuses described above, since the digital control circuit includes a control circuit arranged to perform data communication or input/output of a signal between the digital control circuit and a load circuit included in the isolated DC-DC converter, data communication or input/output of a signal can be performed between the digital control circuit and a control unit of an electronic apparatus serving as the load circuit. For example, a current state of operation of the converter can be transmitted from the digital control circuit to the load circuit, and instructions for determining a timing when a voltage is output, a terminal defining a destination to which the voltage is output, and a magnitude of the voltage can be received from the load circuit.

Other elements, features, steps, characteristics and advantages of the present invention will become more apparent from the following detailed description of the preferred embodiments with reference to the attached drawings.

DETAILED DESCRIPTION OF PREFERRED EMBODIMENTS

First Preferred Embodiment

A switching power supply apparatus according to a first preferred embodiment of the present invention will be described with reference to FIGS. 2 to 8.

Figure 1:
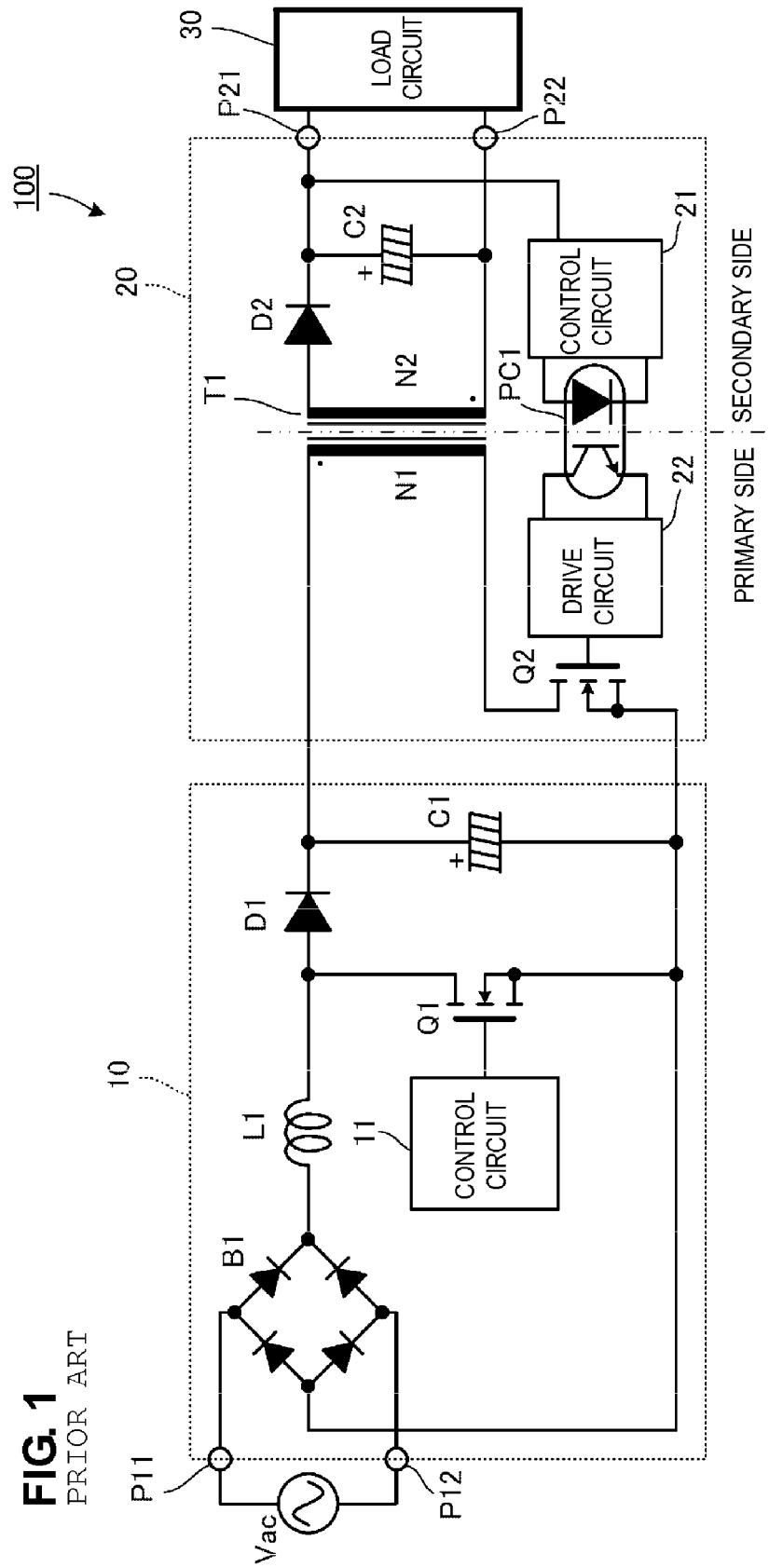
FIG. 1 is a circuit diagram illustrating a configuration example of a conventional switching power supply apparatus.
Figure 2:
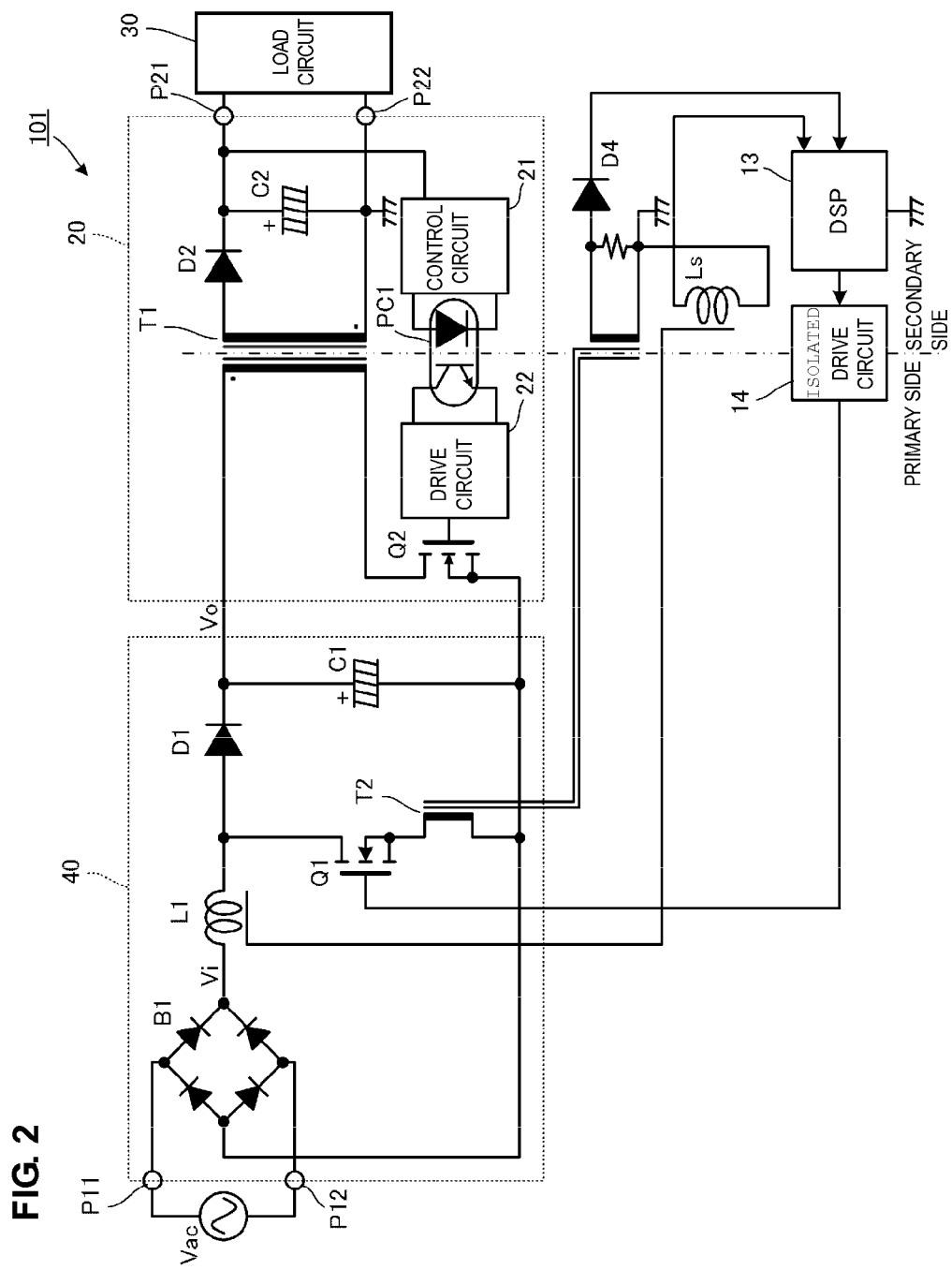
FIG. 2 is a circuit diagram illustrating a switching power supply apparatus according to a first preferred embodiment of the present invention.

FIG. 2 is a circuit diagram illustrating a switching power supply apparatus 101 according to the first preferred embodiment. Unlike the circuit in the related art shown in FIG. 1, a digital signal processing circuit 13 defining a "digital control circuit" is included in a secondary side of an isolated DC-DC converter 20. The digital signal processing circuit 13 is preferably configured as a DSP, for example.

A primary side of a current transformer T2 is connected to a drain current path of a switching element Q1 included in a PFC converter 40. A secondary side of the current transformer T2 is connected to the digital signal processing circuit 13. Note that a diode D4 connected to the secondary side of the current transformer T2 is used to detect a current supplied between a drain and a source while a zero line is not changed in a period in which the switching element Q1 is in an on state.

An inductor L1 included in the PFC converter 40 includes a bias winding Ls, and a voltage signal output from the bias winding Ls of the inductor is supplied to the digital signal processing circuit 13.

An isolated drive circuit 14 is interposed between the digital signal processing circuit 13 and a gate of the switching element Q1 included in the PFC converter 40, and transmits a control pulse signal in an isolated state. The isolated drive circuit 14 includes, for example, a pulse transformer or a photocoupler.

The operation of the digital signal processing circuit 13 shown in FIG. 2 will be described hereinafter.

Figure 3A:
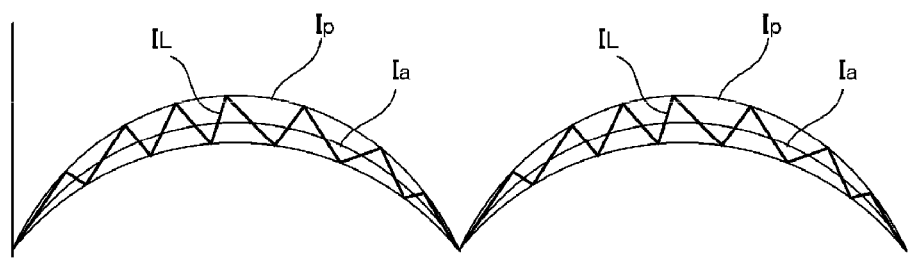
FIGS. 3A to 3C are diagrams illustrating waveforms of currents supplied to an inductor in various control modes of a PFC converter.
Figure 3B:
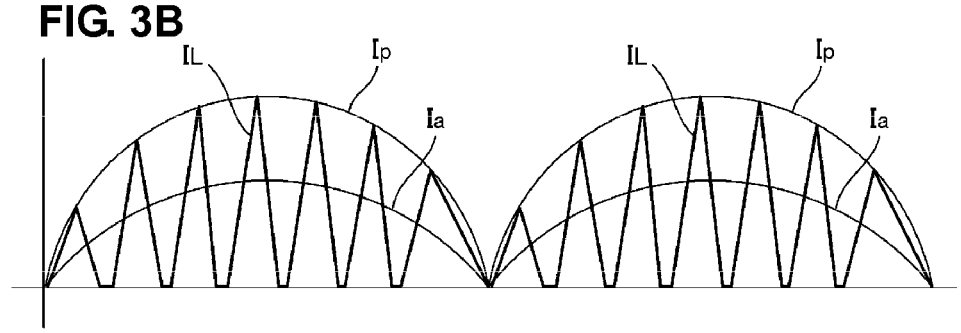
Figure 3C:
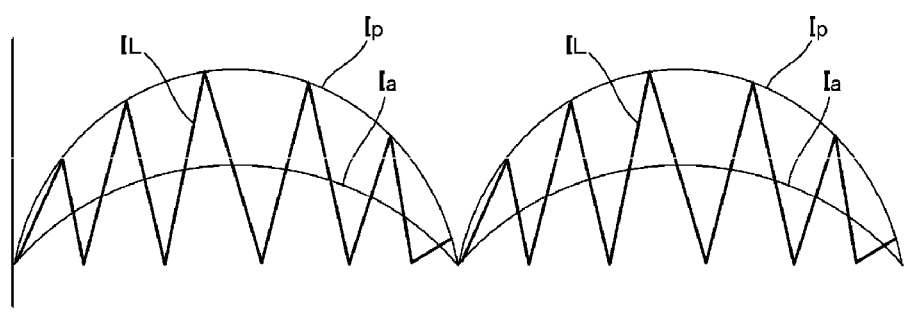

FIGS. 3A to 3C are diagrams illustrating various methods for controlling the PFC converter 40 by the digital signal processing circuit 13. FIGS. 3A to 3C show current waveforms in one cycle of an AC input power supply (commercial AC power supply). Note that $I_L$ denotes a waveform of a current supplied to the inductor L1 included in the PFC converter 40 shown in FIG. 2, $I_p$ denotes an envelope curve of peak values of the waveforms $I_L$, and $I_a$ denotes an average value of currents (average current) in one switching cycle. Note that, for convenience of illustration, when a switching frequency of the PFC converter 40 is considerably low, a waveform of a current supplied to the inductor L1 is shown as a triangle waveform.

FIG. 3A shows a waveform diagram in a current continuous mode, FIG. 3B shows a waveform diagram in a current discontinuous mode, and FIG. 3C shows a waveform diagram in a current critical mode. In the current continuous mode shown in FIG. 3A, a current supplied to the inductor L1 included in the PFC converter 40 is not reduced to zero except for a zero cross of an AC input power supply and in the vicinity thereof. In the current discontinuous mode shown in FIG. 3B, a period in which a current value is reduced to zero is generated every time an exciting energy is accumulated in or discharged from the inductor L1 included in the PFC converter 40. In the current critical mode shown in FIG. 3C, a current value is reduced to zero every time an exciting energy is accumulated in or discharged from the inductor L1 included in the PFC converter 40, and the state in which the current value is zero is not continued.

Figure 4:
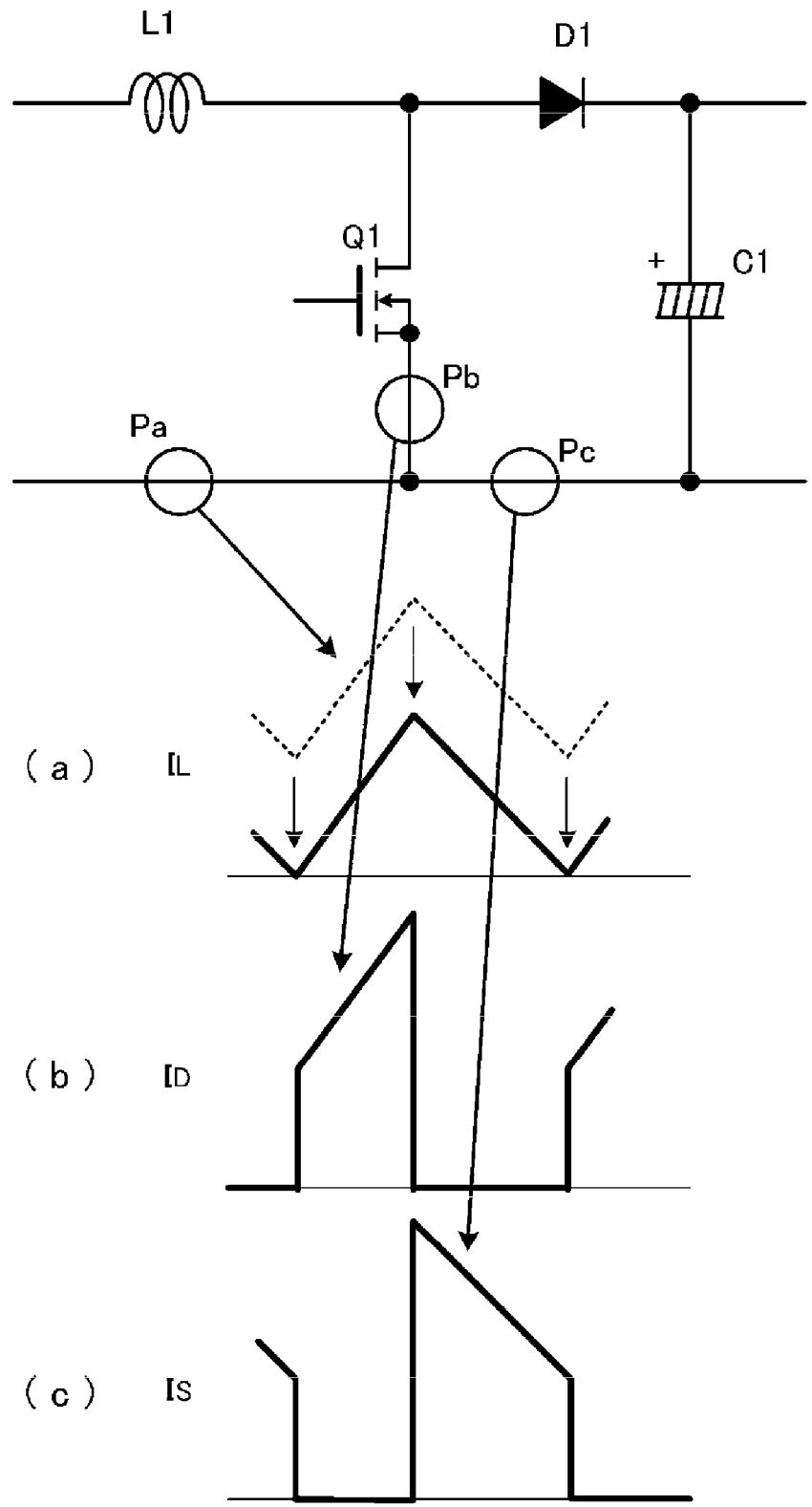
FIG. 4 is a diagram illustrating a method for detecting an inductor current.

FIG. 4 is a diagram illustrating a method for detecting a current supplied to the inductor L1 included in the PFC converter 40. FIG. 4 shows a portion of FIG. 2. In FIG. 4, current waveforms (a) to (c) are detected at current detection points Pa, Pb, and Pc, respectively. As shown in FIG. 2, since the current transformer T2 is disposed in the drain current path of the switching element Q1, the digital signal processing circuit 13 detects the current waveform shown in (b) of FIG. 4. That is, the digital signal processing circuit 13 samples a voltage output from a secondary side of the current transformer T2 in a predetermined sampling cycle, converts the voltage into a digital data sequence, and performs various calculation processes which will be described hereinafter.

In FIG. 4, when a current transformer is disposed in a position of the current detection point Pc, a current waveform of a current $I_S$ supplied to a diode D1 can be detected. A current supplied to the current detection point Pa, that is, the current $I_L$ supplied to the inductor L1 is obtained by combining the drain current $I_D$ supplied to the switching element Q1 with the current $I_S$ supplied to the diode D1 as shown in (a) of FIG. 4. When the current $I_L$ is to be transmitted to the digital signal processing circuit 13 using a current transformer, only a changed component can be transmitted as shown as a dashed line in (a) of FIG. 4 since the current transformer is not capable of transmitting a DC component.

Note that instead of the method using a current transformer, a method for inserting a resistor at a current detection point and detecting a voltage drop of the resistor may be used, for example.

Figure 5:
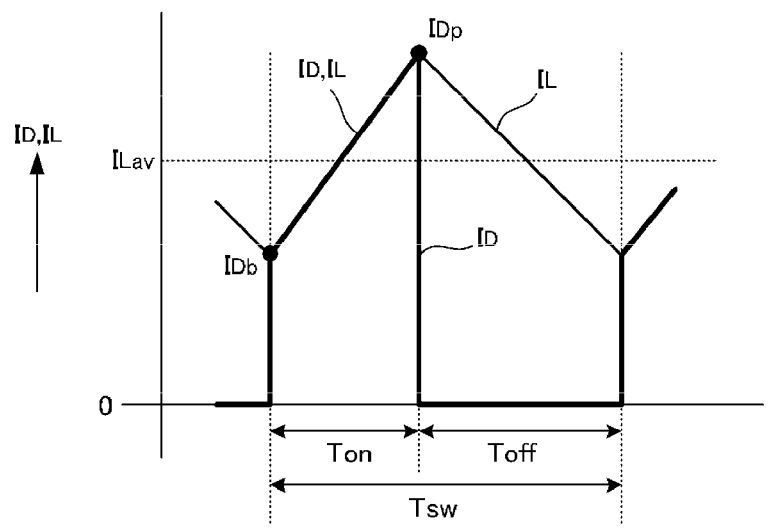
FIG. 5 is a diagram illustrating a method for obtaining an average value of currents supplied to the inductor.

FIG. 5 is a diagram illustrating a method for obtaining an average value of currents supplied to the inductor L1 to perform an average current control in the current continuous mode. A current $I_D$b of a drain current $I_D$ supplied to the switching element Q1, the current Ipb being obtained when the switching element Q1 is turned on, and a peak value $I_D$p (a current value obtained immediately before the switching element Q1 is tuned off) are extracted, and a value $I_L$av which is an average of currents supplied to the inductor L1 is obtained using an average value calculation represented by Expression (1) below.

$$I_L av = (I_D p + I_D b)/2 \qquad (1)$$

That is, a waveform of a current supplied to the inductor L1 is denoted by $I_L$ in FIG. 5. Since the current waveform $I_L$ is linearly changed between the current values $I_D$b and $I_D$p, an average value between the current values $I_D$b and $I_D$p corresponds to the value $I_L$av representing the average of the currents supplied to the inductor L1. In this manner, the value $I_L$av representing the average of the currents supplied to the inductor L1 can be obtained based on the drain current supplied to the switching element Q1, while a problem which arises when the currents supplied to the inductor L1 are transmitted to the digital signal processing circuit through the isolated unit as shown in FIG. 4 is avoided.

Figure 6:
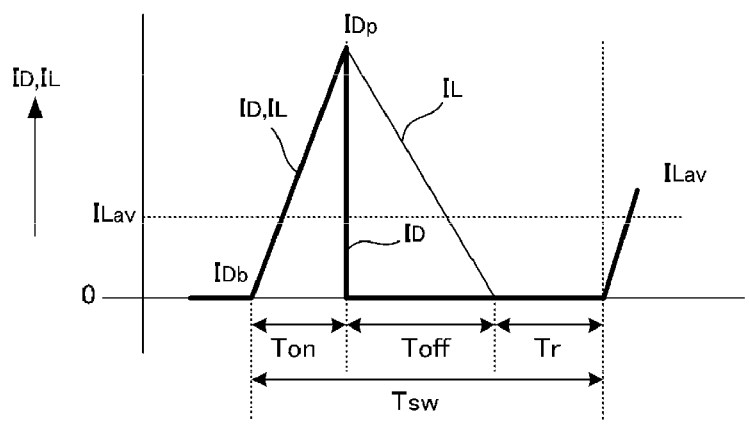
FIG. 6 is a diagram illustrating a method for obtaining an average value of inductor currents in a current discontinuous mode.

FIG. 6 is a diagram illustrating a method for obtaining an average value of currents supplied to the inductor L1 in the current discontinuous mode.

In the current discontinuous mode, a current supplied to the inductor L1 is zero when the switching element Q1 is turned on and returns to zero when the switching element Q1 is turned off. A period Tr in which the current corresponds to zero is continued until the switching element Q1 is turned on again. Therefore, in order to obtain an average value of currents supplied to the inductor L1 in the current discontinuous mode, the period Tr in which the inductor current represents zero should be detected.

Assuming that a current supplied to the switching element Q1 when the switching element Q1 is turned on is denoted by $I_D$b, a peak current is denoted by $I_D$p, an on-period of the switching element Q1 is denoted by Ton, an off-period of the switching element Q1 is denoted by Toff, and a current-zero period is denoted by Tr, an average current $I_L$av is obtained by Expression (2) below.

$$I_L av = \{(I_D p + I_D b)/2\}\{(Ton + Toff)/(Ton + Toff + Tr)\} \qquad (2)$$

In this manner, even in the current discontinuous mode, the average value $I_L$av of the currents supplied to the inductor L1 can be obtained on the basis of the detection of the drain current supplied to the switching element Q1. Therefore, in order to obtain the average value $I_L$av as described above, the period Tr should be detected. The period Tr can be detected in three methods.

A bias winding is disposed in the inductor L1, and the current-zero period Tr is detected using a voltage output from the bias winding. That is, a drop of a waveform of the voltage output from the bias winding is detected, and a time point when the drop of the waveform is detected is determined as an "inductor-current zero" point. When the inductor-current zero point is detected, the off-period and an inductor-current zero period can be distinguished from each other since the DSP has recognized a switching cycle and the on-period. When the switching element Q1 is in an off state and the diode D1 is in an off state, the inductor resonates. Therefore, when the drop of the voltage waveform is detected, a time point when the drop of the voltage waveform is detected is determined as the "inductor-current zero" point.

A current transformer is disposed at the current detection point Pa shown in FIG. 4 so as to directly detect an inductor current, and samples an obtained value so as to detect the current-zero period Tr. However, in this case, high-speed calculation processing is required.

Since a period in which the drain current $I_D$b of the switching element Q1 is equal to zero is continued, it is determined that the current discontinuous mode has been entered. Accordingly, when the current discontinuous mode is detected, approximate correction is performed so that an average value of the inductor currents is obtained. In this method, since the inductor current is not directly detected, a simple circuit configuration is obtained. However, since a distortion of a current waveform is generated due to approximation, the harmonic prevention effect is somewhat deteriorated.

Figure 7:
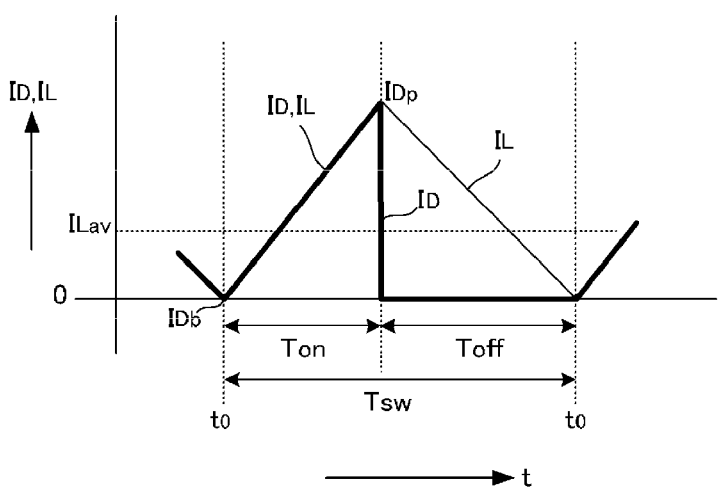
FIG. 7 is a diagram illustrating a method for detecting a timing when an inductor current corresponds to zero in a critical mode in a peak current control technique.

FIG. 7 is a diagram illustrating a method for detecting the peak value of the current supplied to the inductor L1 in a peak current control technique. In the peak current control technique, operation is performed in the critical mode. The current waveform of the critical mode is shown in FIG. 3C. A timing when an inductor current becomes zero is detected and the switching element Q1 is turned on. The timing when the current supplied to the inductor becomes zero is transmitted in an isolated state to the digital signal processing circuit 13 via the bias winding Ls of the inductor L1 which defines a circuit arranged to transmit a timing when the current supplied to the inductor becomes zero.

The peak value of the current supplied to the inductor L1 is detected by detecting the peak value $I_D$p of the drain current supplied to the switching element Q1. Then, switching control is performed so that the peak value corresponds to a reference sine wave. As a result, the current shown in FIG. 3C is supplied to the inductor L1.

Note that, in the critical mode, the inductor current does not include a DC bias component. Therefore, instead of the current supplied to the switching element Q1, the current supplied to the inductor L1 may be directly detected and may be transmitted to the digital signal processing circuit 13 in an isolated state.

Furthermore, control in an on-period is performed as follows.

Since the control in an on-period is performed in the critical mode, a current $I_L$ supplied to the inductor L1 of the PFC converter is detected, and the switching element Q1 is turned on at a timing when the current $I_L$ becomes zero (a timing represented by t0 in FIG. 7). Then, the on-period Ton is maintained constant or substantially constant in all phases of an input voltage. In this manner, an input current has a sine waveform, and the reference sine wave is not required.

Figure 8:
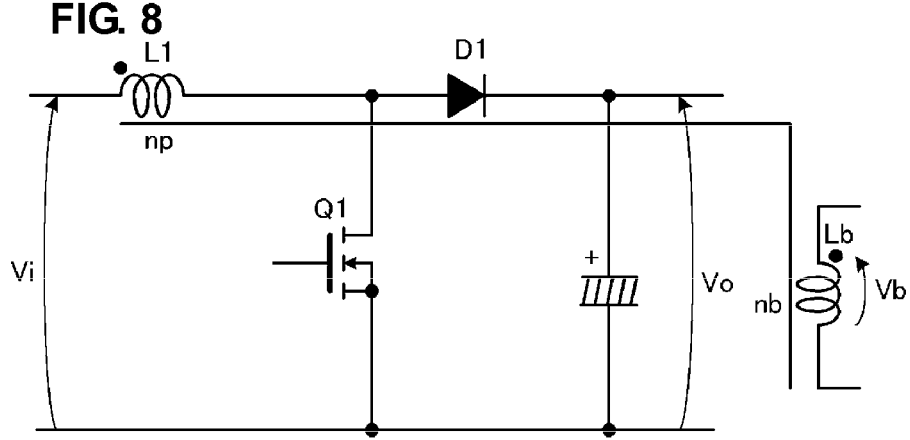
FIG. 8 is a diagram illustrating a method for detecting a voltage output from a PFC converter based on a voltage of a bias winding of the inductor.

FIG. 8 is a diagram illustrating a method for detecting a voltage Vo output from the PFC converter 40, that is, a voltage input to the isolated DC-DC converter 20. FIG. 8 shows a portion of FIG. 2.

Here, a voltage input to the PFC converter 40, that is a voltage output from a diode bridge B1, is denoted by Vi, and a winding ratio of a main winding of the inductor L1 to a bias winding Lb is denoted by np:nb. When the switching element Q1 is in an on state, a voltage Vb of the bias winding Lb is represented by Expression (3) below, whereas when the switching element Q1 is in an off state, the voltage Vb is represented by Expression (4) below.

$$Vbon=(nb/np)Vi \quad (3)$$

$$Vboff=-(nb/np)(Vo-Vi) \quad (4)$$

Accordingly, the voltage Vo output from the PFC converter 40 is obtained using the voltage Vb of the bias winding Lb of the inductor L1 in accordance with Expression (5) below.

$$Vbon-Vboff=(nb/np)Vo \quad (5)$$

In the various modes shown in FIGS. 3A to 3C, the digital signal processing circuit 13 shown in FIG. 2 performs switching control so that the average value or the peak value of the current supplied to the inductor L1 corresponds to the reference sine wave. As the reference sine wave, a voltage signal of the input voltage Vi is preferably used. The voltage signal of the input voltage Vi is obtained as follows.

As shown in FIG. 5, a difference between the minimum value and the maximum value ($I_Dp-I_Db$) of the current $I_D$ supplied to the switching element of the PFC converter or a current Is supplied to the rectifying/smoothing circuit, an inductance L of the inductor L1 of the PFC converter, and the on-period Ton of the switching element of the PFC converter have the following relationship.

$$I_Dp-I_Db=(Vi/L)Ton \quad (6)$$

Here, since the values $I_Dp$, $I_Db$, L, and Ton are known, the input voltage Vi is obtained from a calculation in accordance with Expression (6).

Second Preferred Embodiment

Figure 9:
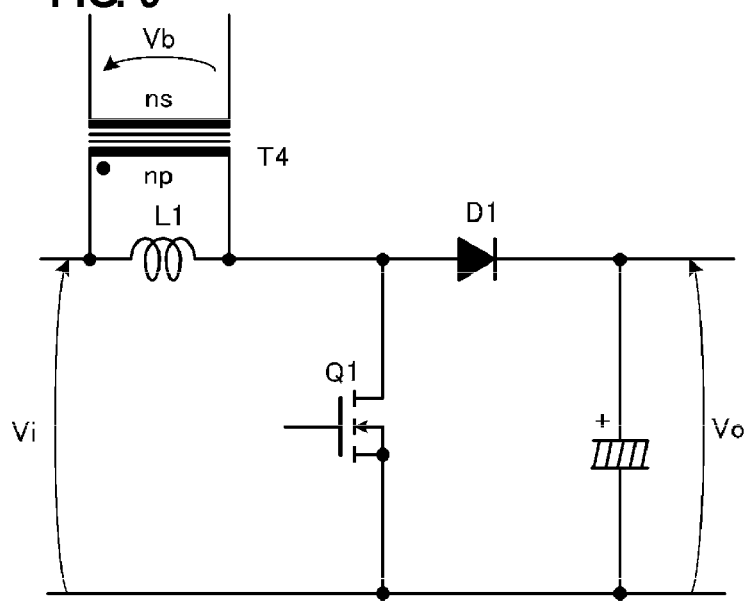
FIG. 9 is a diagram illustrating a method for detecting a voltage output from a PFC converter by connecting a pulse transformer to an inductor included in a switching power supply apparatus according to a second preferred embodiment of the present invention.

FIG. 9 is a diagram illustrating a configuration of an inductor L1 and in the vicinity thereof included in a switching power supply apparatus according to a second preferred embodiment of the present invention. Other configurations are substantially the same as those shown in FIG. 2.

In the second preferred embodiment, a method for detecting a voltage Vo output from a PFC converter 40 will be described. Note that, in an example shown in FIG. 9, a pulse transformer T4 is disposed in the inductor L1 so that the output voltage Vo is obtained based on a voltage Vb on a secondary side of the pulse transformer T4.

Assuming that a winding ratio of a primary winding to a secondary winding of the pulse transformer T4 is denoted by np:ns, the voltage output from the pulse transformer T4 when a switching element Q1 is in an on state is also represented by Expression (3), and the voltage Vo output from the PFC converter is also calculated on the basis of Expression (5).

Third Preferred Embodiment

Figure 10:
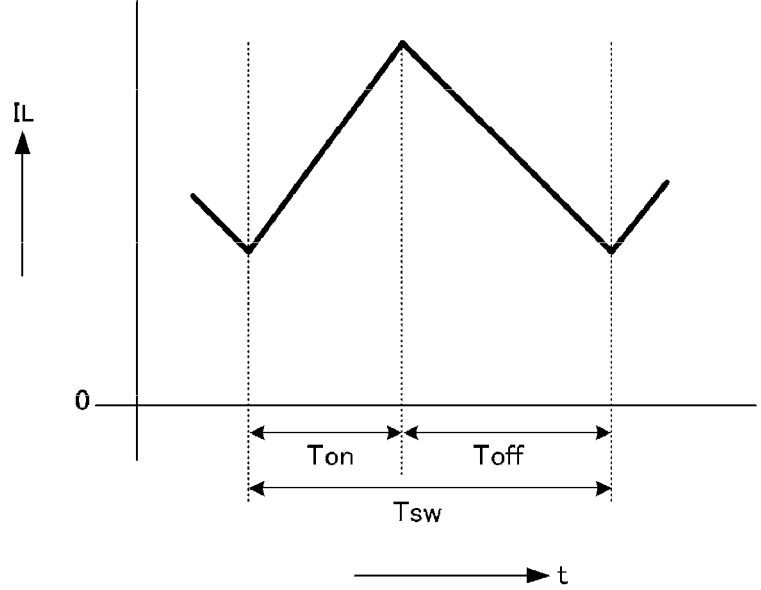
FIG. 10 is a diagram illustrating a method for detecting an output voltage of a PFC converter based on an inclination of a waveform of a current supplied to the inductor of a switching power supply apparatus according to a third preferred embodiment of the present invention.

FIG. 10 is a diagram illustrating a method for detecting a voltage input to a PFC converter and a voltage output from the PFC converter included in a switching power supply apparatus according to a third preferred embodiment of the present invention. A circuit configuration is substantially the same as that shown in FIG. 2.

In the third preferred embodiment, a voltage Vo output from a PFC converter 40 is detected based on an inclination of a current $I_L$ supplied to an inductor L1 shown in FIG. 10.

Here, when an inclination of the current $I_L$ when a switching element Q1 is in an on state (Ton) is denoted by $\Delta I_{Lon}$, an inclination in an off state (Toff) is denoted by $\Delta I_{Loff}$, an input voltage is denoted by Vi, an output voltage is denoted by Vo, and an inductance of the inductor L1 is denoted by L, Expressions (7) and (8) below are obtained.

$$\Delta I_{Lon}=(Vi/L)Ton \quad (7)$$

$$\Delta I_{Loff}=\{(Vo-Vi)/L\}Toff \quad (8)$$

The values $\Delta I_{Lon}$ and $\Delta I_{Loff}$ can be obtained using drain currents $I_Db$ and $I_Dp$, the on-period Ton, and the off-period Toff. Accordingly, the voltage Vo output from the PFC converter 40 is obtained on the basis of an output voltage on a secondary side of a current transformer T2.

Fourth Preferred Embodiment

Figure 11:
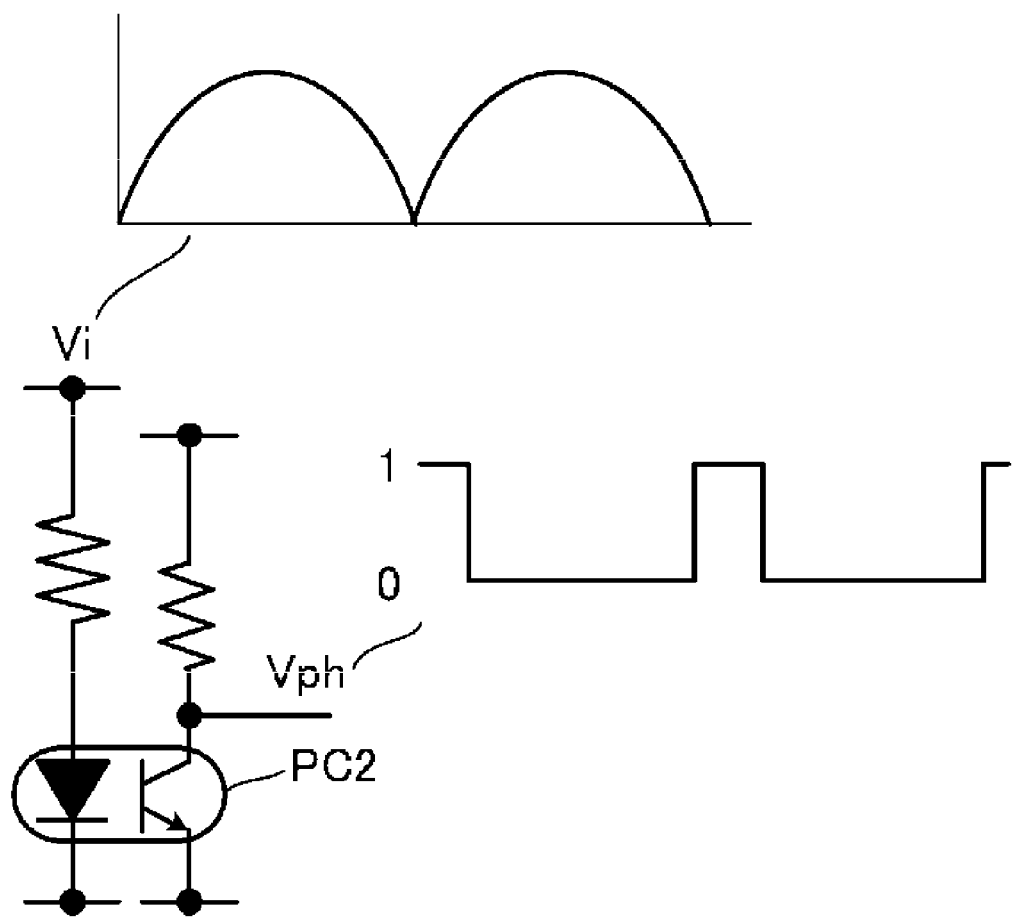
FIG. 11 is a diagram illustrating a method for detecting a phase of a voltage waveform of an AC input power supply of a switching power supply apparatus according to a fourth preferred embodiment of the present invention.

FIG. 11 is a diagram illustrating a method for detecting a phase of a voltage input to a switching power supply apparatus according to a fourth preferred embodiment of the present invention. FIG. 11 shows a circuit to be added to the PFC converter 40 shown in FIG. 2. A photocoupler PC2 receives a voltage Vi input to the PFC converter 40 (specifically, a voltage output from a diode bridge B1) shown in FIG. 2 and transmits the voltage Vi to a secondary side in an isolated state. The input voltage Vi has a full-wave rectification waveform with a rectangular shape which is defined by a binary signal obtained by determining whether an output voltage Vph on a secondary side exceeds a predetermined threshold value obtained in accordance with a characteristic of a light emitting unit and a characteristic of a light receiving unit of the photocoupler PC2. A digital signal processing circuit 13 detects a phase angle of the input voltage Vi (full-wave rectification waveform) based on the timing of a rising edge or a trailing edge, and generates a reference sine wave based on the detected phase angle.

Fifth Preferred Embodiment

Figure 12:
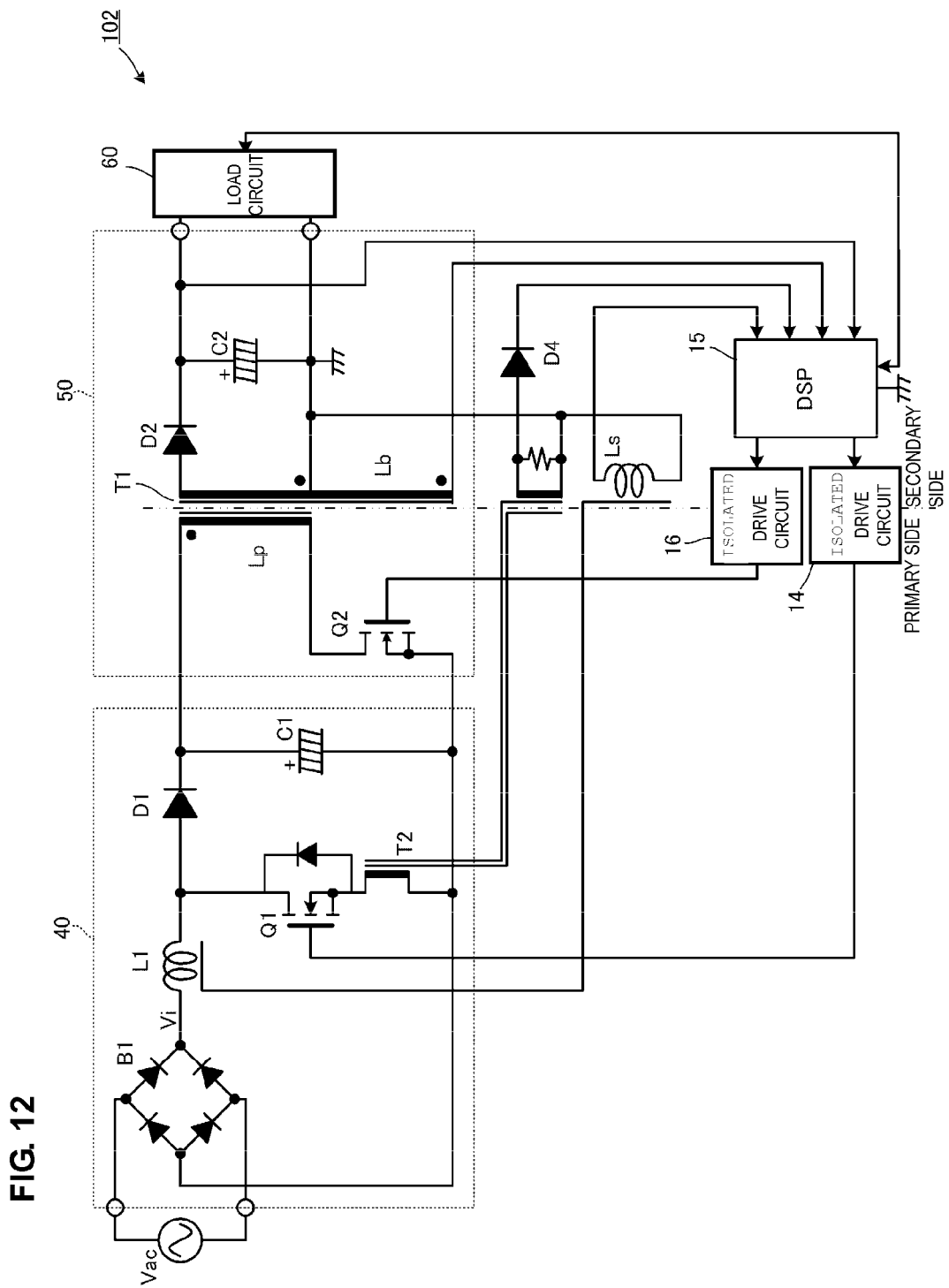
FIG. 12 is a circuit diagram illustrating a switching power supply apparatus according to a fifth preferred embodiment of the present invention.

FIG. 12 is a circuit diagram illustrating a switching power supply apparatus according to a fifth preferred embodiment of the present invention. Unlike the switching power supply apparatus shown in FIG. 2, a digital signal processing circuit 15 detects a voltage output from an isolated DC-DC converter and performs switching control of the isolated DC-DC converter 50. Furthermore, the digital signal processing circuit 15 includes a control unit which performs data communication or input/output of signals between the digital signal processing circuit 15 and a load circuit 60 so as to directly perform the data communication or input/output of signals without using an isolated unit.

In FIG. 12, a transformer T1 of the isolated DC-DC converter 50 includes a bias winding Lb. The digital signal processing circuit 15 receives a voltage output from the bias winding Lb and transmits a control pulse signal to a switching element Q2 through an isolated drive circuit 16. Other configurations are substantially the same as those shown in FIG. 2.

As described above, since the digital signal processing circuit 15 which performs switching control on the PFC converter 40 also performs switching control on the isolated DC-DC converter, an additional circuit used to perform the switching control on the isolated DC-DC converter 50 is not required, and accordingly, the overall circuit configuration is simplified. Furthermore, since the digital signal processing circuit 15 recognizes states of the PFC converter 40 and the isolated DC-DC converter 50, operation of the PFC converter 40 and operation of the isolated DC-DC converter 50 can be easily coordinated with each other. Accordingly, a switching power supply apparatus having high functionality can be provided.

Figure 13:
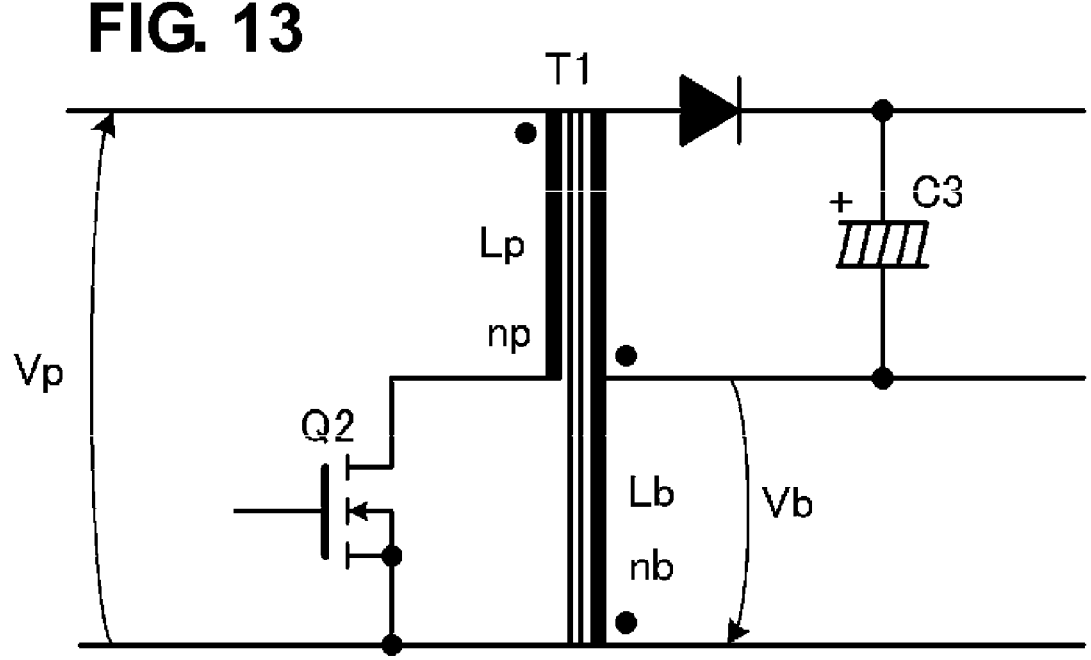
FIG. 13 is a diagram illustrating a method for detecting a voltage output from a PFC converter based on a voltage of a bias winding of a transformer of a converter.

FIG. 13 is a diagram illustrating a method for obtaining a voltage output from the PFC converter 40 based on the voltage of the bias winding Lb of the transformer T1. FIG. 13 shows a portion of FIG. 12.

In FIG. 13, when the number of winding of a primary winding Lp of the transformer T1 is denoted by np, the number of winding of the bias winding Lb is denoted by nb, and a voltage applied to the primary winding Lp when the switching element Q2 is turned on is denoted by Vp, Expression (9) below is obtained.

$$Vp=(np/nb)Vb \quad (9)$$

As described above, the voltage Vp input to the isolated DC-DC converter 50, i.e., the voltage Vo output from the PFC converter 40 is obtained by detecting the voltage Vb of the bias winding Lb.

Sixth Preferred Embodiment

Figure 14:
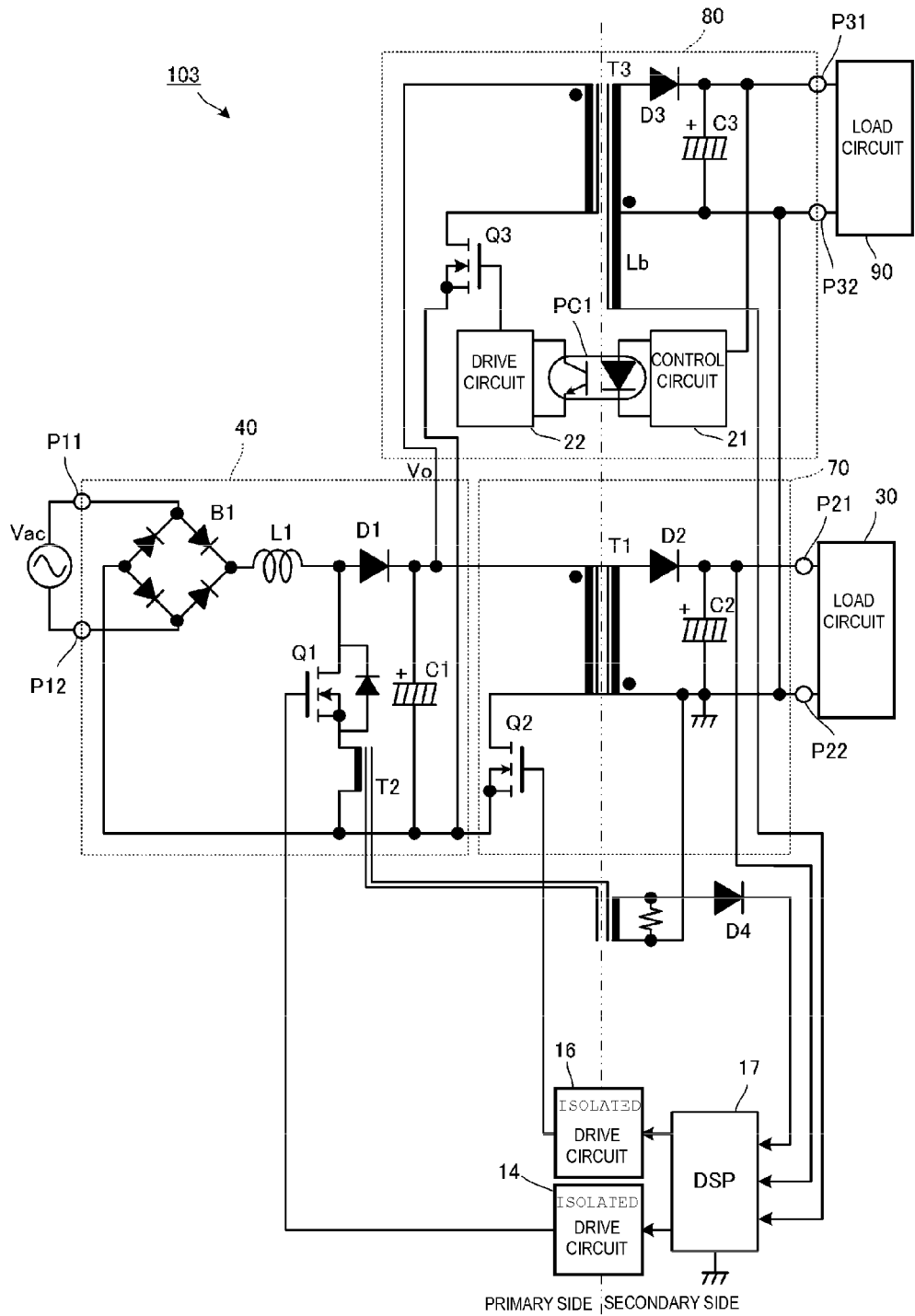
FIG. 14 is a circuit diagram illustrating a switching power supply apparatus according to a sixth preferred embodiment of the present invention.

FIG. 14 is a circuit diagram illustrating a switching power supply apparatus according to a sixth preferred embodiment of the present invention. Unlike the circuit shown in FIG. 12, an auxiliary isolated DC-DC converter 80 which receives a voltage output from the PFC converter 40 is disposed in the sixth preferred embodiment. That is, a switching element Q3 and a drive circuit 22 which drives the switching element Q3 are disposed on a primary side of a transformer T3, and a rectifying diode D3, a smoothing capacitor C3, and a control circuit 21 which performs switching control on the switching element Q3 are disposed on a secondary side of the transformer T3. The control circuit 21 supplies a control pulse signal to a drive circuit 22 through a photocoupler PC1.

Furthermore, a digital signal processing circuit 17 receives a voltage output from a bias winding Lb of the transformer T3 included in the auxiliary isolated DC-DC converter 80. In this example, the digital signal processing circuit 17 further receives a voltage output from an auxiliary isolated DC-DC converter 70. Note that a diode D4 connected to a secondary side of a current transformer T2 is used to detect a current supplied between a drain and a source in a period in which the switching element Q1 is in an on state while a zero line is not changed. Other configurations are substantially the same as those shown in FIG. 12.

In this manner, a voltage Vo output from the PFC converter 40 may be detected based on a voltage of the bias winding Lb of the transformer T3 included in the auxiliary isolated DC-DC converter 80 which is not controlled by the digital signal processing circuit 17. That is, in such a flyback DC-DC converter, since a voltage generated in the bias winding Lb is proportional to a voltage supplied to a primary side, the voltage Vo output from the PFC converter 40 can be detected through a simple proportion calculation of a winding ratio.

Furthermore, in an example shown in FIG. 14, since the digital signal processing circuit 17 performs switching control on the auxiliary isolated DC-DC converter 70, an on-duty value is known due to the digital signal processing circuit 17. Moreover, since a winding ratio of a primary winding to a secondary winding of a transformer T1 is also known, a voltage input to the converter 70, that is, the voltage Vo output from the PFC converter 40 may be calculated using a voltage output from the converter 70.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A switching power supply apparatus comprising:
a power factor correction converter including a rectifying circuit arranged to perform full-wave rectification on an AC input power supply, a switching circuit arranged to perform switching of a voltage output from the rectifying circuit, an inductor arranged to allow a current intermittently supplied from the switching circuit to flow, a rectifying/smoothing circuit arranged to rectify and smooth a voltage output from the inductor, and an average current control circuit arranged to control the switching circuit so that an average value of currents supplied to the inductor and a voltage signal supplied from the AC input power supply are in phase; and
an isolated DC-DC converter including a transformer, a switching circuit which is connected to a primary winding of the transformer and arranged to perform switching of an output from the power factor correction converter, and a rectifying/smoothing circuit arranged to rectify and smooth an AC voltage generated in a secondary winding of the transformer due to turning on or off of the switching circuit and to output the AC voltage to an output terminal; wherein
a digital control circuit which defines the average current control circuit is disposed on a secondary side of the transformer of the isolated DC-DC converter;
a circuit arranged to transmit a switching control signal output from the digital control circuit to the switching circuit included in the power factor correction converter in an isolated state, a circuit arranged to transmit a signal used to detect a voltage output from the power factor correction converter to the digital control circuit in an isolated state, and a circuit arranged to transmit a value of a current supplied to the inductor included in the power factor correction converter to the digital control circuit in an isolated state are included;
the circuit arranged to transmit a signal used to detect a voltage output from the power factor correction converter in an isolated state includes a pulse transformer connected to opposite terminals of the inductor included in the power factor correction converter; and the digital control circuit includes a calculating circuit arranged to detect a voltage applied to opposite sides of the inductor in accordance with a voltage output from a secondary side of the pulse transformer, and to calculate a voltage (Vo) output from the power factor correction converter in accordance with a voltage (Vbon) obtained when the switching circuit included in the power factor correction converter is in an on state and a voltage obtained when the switching circuit is in an off state, which are applied to the inductor.

2. The switching power supply apparatus according to claim 1, wherein the circuit arranged to transmit a value of a current supplied to the inductor in an isolated state includes a circuit arranged to detect a current ($I_D$) supplied to the switching circuit included in the power factor correction converter or a current ($I_s$) supplied to the rectifying/smoothing circuit included in the power factor correction converter in an isolated state; and the digital control circuit includes a calculating circuit arranged to detect an average value between a minimum value and a maximum value of the current ($I_D$) supplied to the switching circuit included in the power factor correction converter or the current ($I_S$) supplied to the rectifying/smoothing circuit included in the power factor correction converter as an average value of currents supplied to the inductor included in the power factor correction converter.

3. The switching power supply apparatus according to claim 1, wherein the circuit arranged to transmit a value of a current supplied to the inductor in an isolated state includes a circuit arranged to detect the current ($I_D$) supplied to the switching circuit included in the PFC converter or the current ($I_S$) supplied to the rectifying/smoothing circuit included in the power factor correction converter in an isolated state; and the digital control circuit includes a calculating circuit arranged to detect an average value of currents supplied to the inductor included in the power factor correction converter in a current discontinuous mode in accordance with a minimum value and a maximum value of a current supplied to the switching circuit included in the power factor correction converter or a current supplied to the rectifying/smoothing circuit included in the power factor correction converter, an on-period, an off-period, and a period in which a current supplied to the inductor included in the power factor correction converter is zero satisfy the relationship T=(Ton+Tiff+Tr), where a switching cycle of the switching circuit included in the power factor correction converter is denoted by T, the on-period is denoted by Ton, the off-period is denoted by Toff, and the period is denoted by Tr.

4. The switching power supply apparatus according to claim 1, wherein the circuit arranged to transmit a signal used to detect a voltage output from the power factor correction converter in an isolated state is defined by a transformer-type inductor having a main winding arranged to allow a current supplied to the switching circuit included in the power factor correction converter to flow and a bias winding which is connected to the main winding in an isolated state; and the digital control circuit includes a calculating circuit arranged to detect a voltage applied to opposite sides of the main winding of the inductor in accordance with a winding ratio of the main winding to the bias winding of the inductor and a voltage of the bias winding of the inductor and to calculate the voltage (Vo) output from the power factor correction converter in accordance with the voltage (Vbon) obtained when the switching circuit included in the power factor correction converter is in an on state and a voltage (Vboff) obtained when the switching circuit is in an off state.

5. The switching power supply apparatus according to claim 1, wherein the circuit arranged to transmit a signal used to detect a voltage output from the power factor correction converter in an isolated state includes an auxiliary winding of the transformer disposed in the isolated DC-DC converter; and the digital control circuit includes a calculating circuit arranged to detect a voltage output from the power factor correction converter in accordance with a winding ratio of the primary winding to the auxiliary winding of the transformer included in the isolated DC-DC converter and a voltage of the auxiliary winding.

6. The switching power supply apparatus according to claim 1, wherein the circuit arranged to transmit a signal used to detect a voltage output from the power factor correction converter in an isolated state includes an auxiliary isolated DC-DC converter arranged to receive a voltage output from the power factor correction converter as an input power supply, to insulate the primary side and the secondary side of the transformer from each other, and to perform electrical conversion; and the digital control circuit includes a calculating circuit arranged to detect a voltage output from the power factor correction converter in accordance with a voltage output from the auxiliary isolated DC-DC converter and an input/output voltage rate of the auxiliary isolated DC-DC converter.

7. The switching power supply apparatus according to claim 1, wherein the circuit arranged to transmit a signal used to detect a voltage output from the power factor correction converter in an isolated state includes the isolated DC-DC converter and a level shift circuit arranged to perform a level shift on a voltage output from the isolated DC-DC converter; and the digital control circuit includes a calculating circuit arranged to detect a voltage output from the power factor correction converter in accordance with a ratio of a voltage output from the level shift circuit to a voltage input to the isolated DC-DC converter and the voltage output from the level shift circuit.

8. The switching power supply apparatus according to claim 1, wherein the circuit arranged to transmit a signal used to detect a voltage output from the power factor correction converter in an isolated state includes a circuit arranged to detect a signal of the current supplied to the inductor included in the power factor correction converter in an isolated state; and the digital control circuit includes a calculating circuit arranged to calculate the voltage output from the power factor correction converter in accordance with an inclination of a change of the current supplied to the inductor when the switching circuit is in an on state and an off state of the switching circuit included in the power factor correction converter and an inductance of the inductor.

9. The switching power supply apparatus according to claim 1, wherein
a switching control circuit of the isolated DC-DC converter includes the digital control circuit.

10. The switching power supply apparatus according to claim 1, wherein
the digital control circuit includes a control circuit arranged to perform data communication or input/output of a signal between the digital control circuit and a load circuit included in the isolated DC-DC converter.

11. A switching power supply apparatus comprising:
a power factor correction converter including a rectifying circuit arranged to perform full-wave rectification on AC input power supply, a switching circuit arranged to perform switching of a voltage output from the rectifying circuit, an inductor arranged to allow a current intermittently supplied from the switching circuit to flow, a rectifying/smoothing circuit arranged to rectify and smooth a voltage output from the inductor, and a peak-current control circuit arranged to drive the switching circuit in a critical mode at a timing when a current supplied to the inductor becomes zero and to control the switching circuit so that a phase of a peak value of the current supplied to the inductor follows a phase of a voltage signal supplied from the AC input power supply; and
an isolated DC-DC converter including a transformer, a switching circuit which is connected to a primary winding of the transformer and arranged to perform switching of an output from the power factor correction converter, and a rectifying/smoothing circuit arranged to rectify and smooth an AC voltage generated in a secondary winding of the transformer and to output the AC voltage to an output terminal; wherein
a digital control circuit arranged to define the peak current control circuit is disposed on a secondary side of the transformer of the isolated DC-DC converter;
a circuit arranged to transmit a switching control signal output from the digital control circuit to the switching circuit included in the power factor correction converter in an isolated state, a circuit arranged to transmit a signal used to detect a voltage output from the power factor correction converter to the digital control circuit in an isolated state, a circuit arranged to transmit a value of the current supplied to the inductor included in the power factor correction converter to the digital control circuit in an isolated state, and a circuit arranged to transmit a timing when the current supplied to the inductor included in the power factor correction converter becomes zero to the digital control circuit in an isolated state are included;
a circuit arranged to transmit a voltage signal supplied from the AC input power supply to the digital control circuit in an isolated state is included;
the circuit arranged to transmit a voltage signal supplied from the AC input power supply in an isolated state includes a circuit arranged to detect a current supplied to the switching circuit included in the power factor correction converter or a current supplied to the rectifying/smoothing circuit included in the power factor correction converter in an isolated state; and
the digital control circuit includes a calculating circuit arranged to detect an instantaneous value of a voltage input to the power factor correction converter in accordance with a difference between a minimum value and a maximum value of the current supplied to the switching circuit included in the power factor correction converter or the current supplied to the rectifying/smoothing circuit in the power factor correction converter, an inductance of the inductor included in the power factor correction converter, and an on-period of the switching circuit included in the power factor correction converter.

12. The switching power supply apparatus according to claim 11, wherein
the circuit arranged to transmit a voltage signal supplied from the AC input power supply in an isolated state includes a circuit arranged to detect a phase of an instantaneous value of a voltage output from the rectifying circuit included in the power factor correction converter or a phase of a voltage of the AC input power supply and transmitting a signal including information on the phase in an isolated state; and
the digital control circuit includes a calculating circuit arranged to generate a sine wave which has a waveform of a voltage input to the power factor correction converter in accordance with the signal including the information on the phase.

* * * * *